US008556161B2

(12) United States Patent
Djoudi

(10) Patent No.: US 8,556,161 B2
(45) Date of Patent: Oct. 15, 2013

(54) ELECTRONIC BALLOT FACILITY

(76) Inventor: Abdelhakim Djoudi, Saint Gelly du Fesc (FR)

( * ) Notice: Subject to any disclaimer, the term of this patent is extended or adjusted under 35 U.S.C. 154(b) by 0 days.

(21) Appl. No.: 13/388,559

(22) PCT Filed: Aug. 19, 2010

(86) PCT No.: PCT/EP2010/062094

§ 371 (c)(1), (2), (4) Date: Feb. 2, 2012

(87) PCT Pub. No.: WO2011/020875

PCT Pub. Date: Feb. 24, 2011

(65) Prior Publication Data

US 2012/0126018 A1 May 24, 2012

(30) Foreign Application Priority Data

Aug. 19, 2009 (FR) ...................................... 09 04006
Mar. 3, 2010 (FR) ...................................... 10 00868

(51) Int. Cl.
*G06K 17/00* (2006.01)

(52) U.S. Cl.
USPC ......................................... 235/50 B; 235/386

(58) Field of Classification Search
USPC ....................... 235/386, 50 B, 51, 50 R, 50 A
See application file for complete search history.

(56) References Cited

U.S. PATENT DOCUMENTS

2002/0134844 A1 9/2002 Morales
2009/0121019 A1* 5/2009 Bauchot et al. ............... 235/386

FOREIGN PATENT DOCUMENTS

| | | |
|---|---|---|
| DE | 101 24 982 | 11/2002 |
| EP | 0 419 335 | 3/1991 |
| EP | 1 477 939 | 11/2004 |
| FR | 2 396 365 | 1/1979 |
| FR | 2 749 423 | 12/1997 |
| FR | 2 851 067 | 8/2004 |

OTHER PUBLICATIONS

International Search Report dated Dec. 8, 2010, corresponding to PCT/EP2010/062094.
French Search Report dated Apr. 4, 2011, corresponding to the Foreign Priority Application No. 1000868.

* cited by examiner

*Primary Examiner* — Karl D Frech
(74) *Attorney, Agent, or Firm* — Young & Thompson

(57) ABSTRACT

An electronic ballot facility, using ballot forms, at least one voting booth, and at least one ballot box is noteworthy in that:

Figure 1:
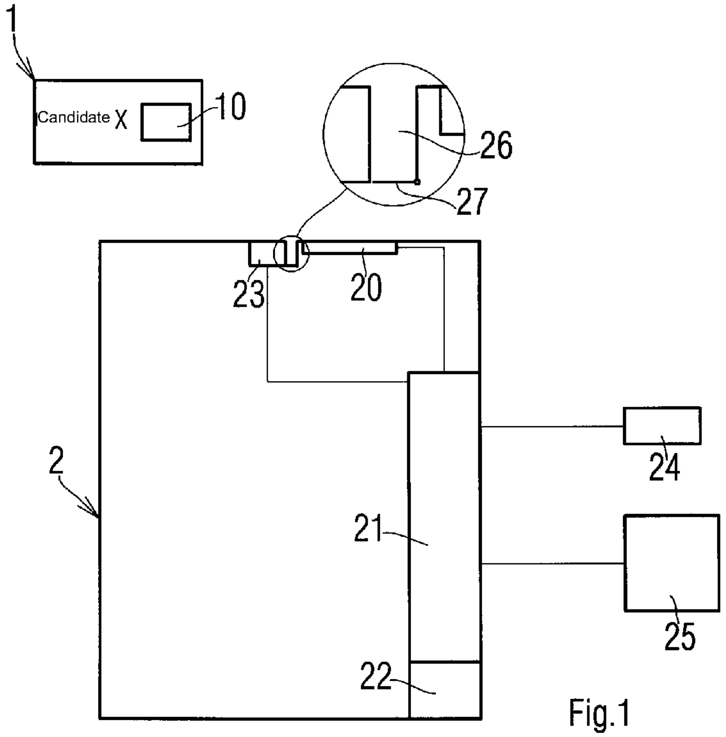

each ballot is provided with an electronic chip including a first contactless reader memory in which a ballot identification code is recorded, with a second contactless read-write memory provided to receive the voter's selection, on one of its sides, the ballot has at least the name and/or the photograph and/or the number of the candidate whose name is written into the memory, each ballot box includes a reader having sensors, capable of reading, without contact, during insertion of the ballot, and through the envelope, the contents of the memories of this ballot's electronic chip, this reader being connected to a self-contained unit built into the ballot box, this self-contained unit being equipped with a memory in which the contents of the ballot's memories are recorded.

23 Claims, 3 Drawing Sheets

ELECTRONIC BALLOT FACILITY

TECHNICAL FIELD

This invention is of the field of equipment used for electronic voting and pertains more particularly to an electronic ballot facility using ballot forms, on the one hand, and at least one ballot box provided to receive ballots during the voting operation, on the other hand.

PRIOR ART

The state of the art of voting facilities using pre-printed ballot forms and sealed ballot boxes that are capable of receiving ballot forms in envelopes is known.

The voting operation consists, first of all, of placing the ballot in a standardized envelope and then placing this envelope with its content in the dedicated ballot box. The voting result is announced after processing and counting the ballot forms.

Such operating methods do not protect the voting results from falsification, and thus, modifications of the contents of the voting boxes have been noted, particularly during transport of the latter to a counting location at a distance from the polling station. Likewise, the voting result may be altered because of interpretation errors, for example, ballots mistakenly considered invalid, or else through counting and/or allocation errors, with ballots being mistakenly assigned to one of the candidates.

In addition, the results are not immediately known following the vote; for most of the voting operations, a delay of a few hours is quite often necessary.

Lastly, too narrow a gap between the candidates after the count often arouses suspicions as to the authenticity of the result. These conflicts bring about either a recount or a new voting operation.

Finally, there is good reason to emphasize the relatively high cost of printing ballot forms.

To remedy these different problems, solutions were proposed for voting by electronic means. Thus, voting machines, by means of which voters can select their candidates, have been put into use. Such machines allow for a real time count of the votes cast and are able to provide a result right at the close of the voting operation. However, more or less justified mistrust still remains in the minds of most voters regarding this ballot method, since no proof is provided that the voter's selection has been correctly taken into account and that his vote has been assigned to the candidate that he has selected.

DISCLOSURE OF THE INVENTION

The purpose of this invention is to resolve the previously raised problems.

To that end, the electronic ballot facility, according to the invention, using ballot forms, at least one voting booth for use by the voter to place the ballot form in an envelope, and at least one ballot box equipped to receive said envelopes, is characterized essentially in that:

- Each ballot form is equipped with an electronic chip, including a first contactless reader memory in which a ballot identification code is recorded, and a second permanent contactless read-write memory provided to receive the voter's selection,
- The ballot has, on one of the sides thereof, at least the name and/or the photograph and/or the number of the candidate whose name and/or number is written into the memory,

- Each ballot box is equipped with at least one built-in reader with at least one sensor that is capable of reading, without contact, when a ballot is inserted therein, and through the envelope, the content of the memories of the electronic chip of this ballot, this reader being connected to a self-contained microprocessor unit that is built into the ballot box, this self-contained unit being equipped with a local memory in which the contents of the ballot memories are recorded.

The self-contained unit receives from the reader the result of reading the electronic chip and records in the local memory the voter's selection in order to ensure in real time the counting of the votes for each candidate.

According to another characteristic of the invention, the ballot box is equipped with an electronic counter that is connected to the self-contained unit in order to count the number of ballots inserted. The results of this count will be recorded in the local memory.

According to another characteristic of the invention, a contactless, portable reader is provided that is connected to the self-contained unit. This arrangement will make it possible to verify after review that the name of the candidate written in the clear on the ballot and the name recorded in memory are consistent.

According to another characteristic of the invention, each voting booth that comprises the facility is equipped:

- With a scanning interface by means of which the voter selects his candidate, this scanning interface being connected to a central unit that is remote and separate from the self-contained unit linked with the ballot box,
- With a ballot form production unit, starting with a blank ballot, connected to a central unit that is capable of writing on one of the sides of the ballot form to annotate the name and/or the photograph of the candidate selected by the voter,
- With a contactless read-write unit connected to the central unit that is capable of writing the voter's selection into the ballot form memory, this unit being built into the ballot form production unit.

This arrangement avoids any advance production of ballot forms, costly in itself, and significantly reduces ballot printing expenses. Moreover, the unused blank ballots can be kept for use in a subsequent voting operation.

To avoid any subsequent falsification, the invention, according to another of its arrangements, calls for the central unit, after writing the voter's selection into the memory of the ballot's electronic chip, to permanently lock in the latter to prevent any subsequent write access.

The central unit will be equipped with a memory containing the identification codes of the ballot forms. In this way, during the voting, it can be verified by reading the identification code that the ballot inserted into the ballot box is a valid ballot.

According to another characteristic of the invention, the central unit is electrically connected to the reader built into the ballot box and to the latter's electronic counter.

Thus, by reading the ballot memory regarding the voter's selection, the central unit will be capable, in real time, of proceeding to the vote count for each candidate. Thus, after closure of the voting operation, the results from the polling station can be provided immediately and be transmitted, for example, by wire to a centralizing body.

Such an arrangement will make it possible, through comparison of the results provided by the ballot box with those provided by the central unit, to ensure their consistency.

According to another characteristic of the invention, the scanning interface consists of a touch screen on which the names of the candidates are displayed as well as the selection of a blank vote. By pressing on the dedicated areas of the touch screen, the voter will make his selection and will validate it. His selection and the validation will be sent to the central unit. This unit will then transmit to the production unit a command to print the name and/or the photograph of the selected candidate and to the writing unit a command to write into the ballot memory the name and/or number of the selected candidate.

According to another characteristic of the invention, the production unit for the ballot forms is a printer.

The ballot forms form a continuous band wound onto a reel, and the printer's housing is equipped with a rotor provided to receive the reel. This printer will also be equipped with a controlled-action cutting element to separate each ballot from the band after printing.

Preferably, according to another arrangement of the invention, writing into the ballot's memory takes place after the latter is printed, particularly in cases where a thermal printer is used. In this way, the content of the memory cannot be altered by the release of heat that can occur during printing.

To further lessen the risk of alteration of the writing in the memory, the contactless writing unit or, at the very least, the sensor with which this unit is equipped, is located at a distance from the print head. Thus, writing into the memory occurs in a distant cold zone that is not in proximity to the heat source, which the print head can constitute.

In addition, according to another characteristic of the invention, the writing unit is located beyond the printer's paper output, external to the space containing the print head, and is separated from said space by a physical barrier made up of one or several partitions. This arrangement further contributes to isolating from the heat source, which the print head constitutes, the zone in which writing into the memory of the ballot occurs.

According to another characteristic of the invention, the contactless writing unit integrates a contactless reader module so that writing into the memory can be reread before issuance of the ballot to the voter. If the writing is illegible, the ballot will be destroyed by means of the printer's cutting element. To do this, the stepper motor of the printer will first be activated in the paper return direction in the printer for a distance corresponding to the length of the ballot and then will be driven towards the output for a distance of a few millimeters, and the cutting element will be activated so that it cuts the ballot. This cycle will be repeated until the ballot is totally shredded. Carefully, the strips of paper thus formed will fall into a dedicated receiving tray. After the erroneous ballot is totally shredded, production of a new ballot will begin.

According to another characteristic of the invention, the scanning interface is equipped with a contactless reader module that is capable of reading the writing contained in the memories of the ballot so that the latter can be displayed on said scanning unit. Thus, the voter, after production of the ballot form, will be able to verify its content by drawing it near to or by placing it against the receiving sensor of this module. The display will be retained as long as the ballot remains in the receiving zone of the module, which typically extends over a distance of at most 5 cm from the latter.

According to another characteristic of the invention, the central unit, during production of the ballot, writes into one of its memories the ballot identifier as well as the voter's selection. Moreover, during insertion of the ballot into the ballot box, the central unit reads the ballot identifier through the reader linked to the ballot box in order to verify that this ballot was already counted during its printing. If not, this ballot could be considered as invalid at the close of voting by the central unit.

According to another characteristic of the invention, the electronic chip contained in each ballot is of the RFID, acronym for (Radio Frequency Identification), type. The RFID chip will be of the low frequency and low power type so as to limit its ability to read or write to at most 5 cm. Such an arrangement, which involves a perfectly controlled and inexpensive solution, is likely to reduce costs associated with the organization of elections.

Lastly, according to another characteristic of the invention, a container, in which is constructed an upper compartment, is provided to receive the production unit, with a side compartment provided to receive the read-write unit, said side compartment being separated from the previous one by a vertical partition equipped with a ballot passage opening, said container being equipped, moreover, with a third compartment provided to receive a tray, this third compartment being separated from the upper compartment by a horizontal separation partition provided near the vertical separation partition with a through opening for the passage of paper strips formed during the destruction by shredding of an erroneous ballot.

SUMMARY DESCRIPTION OF FIGURES AND DRAWINGS

Figure 2:
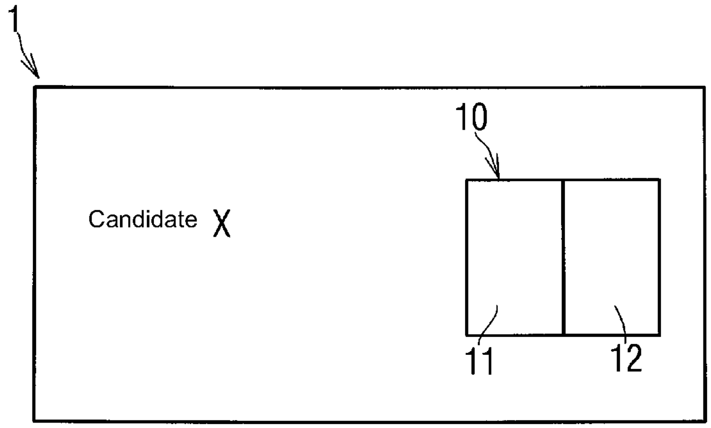
Figure 3:
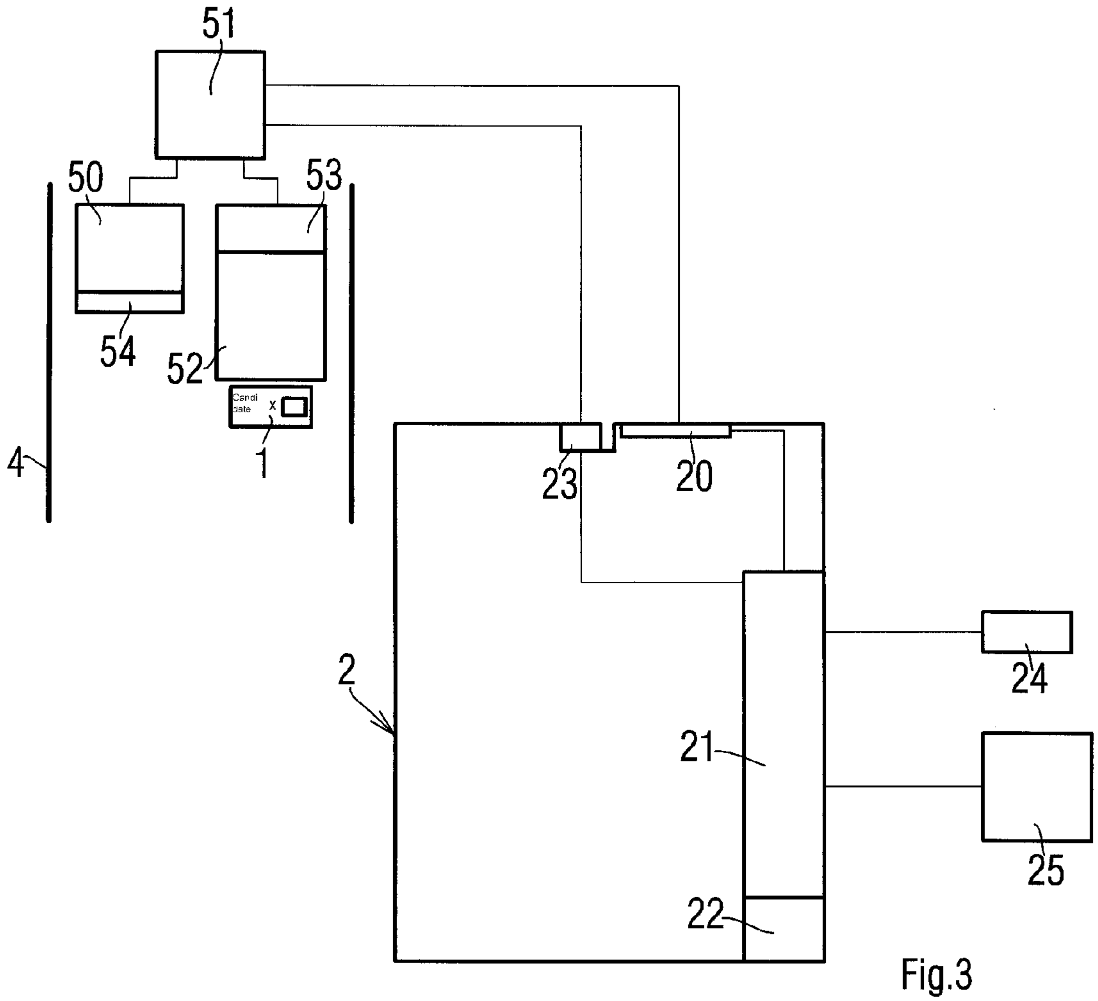
Figure 4:
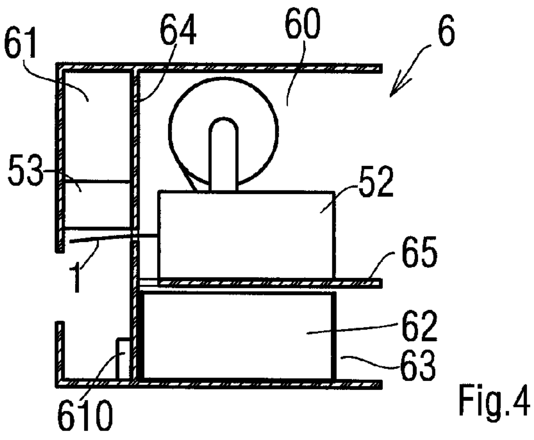
Figure 5:
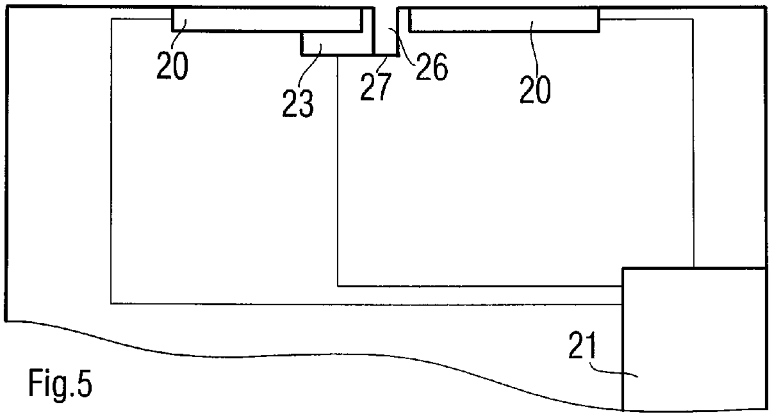
Figure 6:
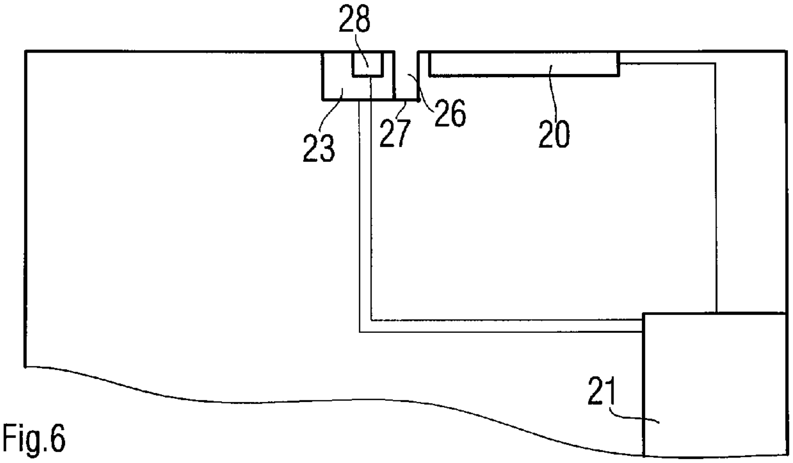
Figure 7:
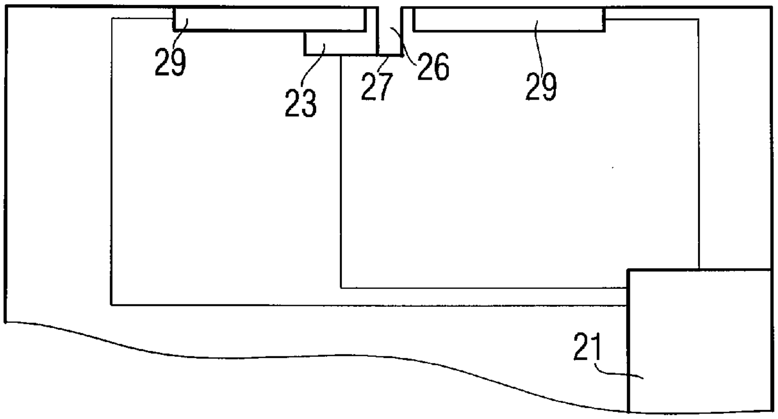

Other advantages, goals and characteristics of the invention will come to light upon reading the description of a preferred embodiment provided as a nonlimiting example, by referring to the appended drawings in which:

FIG. 1 is a diagrammatic view of a facility according to a first embodiment of the invention, FIG. 2 is a diagrammatic view of a ballot form, FIG. 3 is a diagrammatic view of a facility according to a second embodiment of the invention, FIG. 4 is a diagrammatic cutaway view of a ballot production facility, FIGS. 5 to 7 show other embodiments of the ballot box according to the invention.

BEST MANNER OF IMPLEMENTING THE INVENTION

In FIG. 1, a voting facility according to a first embodiment of the invention is represented in diagrammatic form. This facility includes ballot forms 1, each one integrating at least one contactless read-write electronic chip 10, a voting booth 4 in which each voter inserts a ballot form 1 in a standardized envelope, a ballot box 2 that is capable of receiving ballot forms 1, equipped with a contactless reader 20 that is capable of reading the content of the ballot when it is deposited in the ballot box, and a self-contained unit 21 connected to the reader in order to receive from the latter the result of the reading and to record this result in a local memory 22 in order to be tabulated there, this local memory being functionally linked to the self-contained unit 21.

Each ballot form 1, composed of a sheet of paper in a standardized format, incorporates into its body at least one RFID-type electronic chip 10. This chip can also be affixed to one of the sides of the ballot. This chip includes a first memory that is read-only 11 containing the identification code of the ballot, whereby this code can come in the form of a series of numeric, alphabetic or else alphanumeric characters. This chip also includes a second memory 12 provided to receive the voter's selection, namely the name of a candidate and/or a number assigned to the candidate, this second memory being rendered inaccessible for writing after the voter's selection is recorded.

The electronic chip 10 of the ballot can include an additional memory zone that is capable of receiving a code that is representative of the insertion of the ballot into the ballot box, this memory zone, after writing of the code, being rendered inaccessible for writing.

The ballot box 2 is typically made up of a parallelepipedic container supplied with a cover that is equipped with a slot for insertion of ballots, the latter being in envelopes. As previously stated, the ballot box is equipped with an RFID chip reader 20 that is equipped with several sensors, in this case three sensors, this reader 20 being arranged by its sensors near the ballot insertion slot. This reader will be capable of reading the RFID chip 10 and more precisely the content of its memories 11 and 12 through the thickness of the envelope enclosing the ballot form 1. The multiplicity of sensors guarantees good reading quality of the memories of each ballot.

Carefully, a security door 26 for insertion of the ballot will be joined at the insertion slot of the ballot box, this security door including, opposite the slot in the lower part, an insertion flap 27 controlled in the opening and closing directions by a control lever, not shown. Such an arrangement has the advantage of retaining the ballot and its envelope for a few moments in the security door 26 while the memories of said ballot are read.

Alternatively, the flap 27 could be activated by an electric motor controlled in the direction of the flap 27 opening, based on presence information delivered by a presence sensor, not shown, associated with the security door 26, the command for opening then being timed.

The ballot box 2 can be equipped with an electronic counter 23 that is capable of being incremented each time an envelope is deposited. This counter 23 and the reader 20 will be electrically connected to the self-contained unit 21 that will be advantageously integrated into the ballot box or placed at a distance. The self-contained unit 21 will receive from reader 20 the result of its reading and will write this result into the local memory 22. The results will be processed in real time in order to count in real time the number of votes allocated to each candidate.

In the event of an envelope with no ballot inside, the reader 20 will not detect any identification signal, whereas the counter 23 will have recorded an insertion. The vote will then be considered as blank. In the case of several ballots slipped into the same envelope, the reader 20 will detect the presence of several identifiers for a single insertion. In this case, again, the vote will be considered invalid.

The ballot box can be equipped with a writing device that is capable of writing, in the additional zone of the memory of the ballot chip 10, the code that is representative of the insertion of the ballot into its internal space. This writing device will be connected to the self-contained unit 21.

Advantageously, as can be seen in FIG. 5, the ballot box will be equipped with a second reader 20 located opposite the previous one. These first and second readers 20 will be located on both sides of the passageway formed by the security door 26, and the envelope will be positioned between the two readers. During the reading time, the envelope rests on the flap 27, the latter being in a closed position. This second reader will be connected to the self-contained unit 21. Such an arrangement is suited to detecting the presence of several ballots in the envelope. If such an error is detected, the motor of the flap 27 will not be activated, and the voter will be asked by an audio and/or visual message to remove his ballot form. Such an arrangement is suited to detecting other irregularities, for example, the presence in the envelope of a screen that is capable of concealing the ballot form from one of the two readers. Thus, for example, if one of the ballots is placed in metallic paper, one of the readers will be unable to read the ballot. This defect will be detected, and the motor of the flap 27 will not be activated. In this case again, the voter will be asked to withdraw his ballot form.

The flap 27 can only be activated in the direction of opening if the two associated readers 20 give the same reading of the envelope's content.

Alternatively, as can be seen in FIG. 6, an RFID reference chip 28 can be used in place of the second reader. The RFID chip 28 and the reader 20 will be placed on both sides of the passageway formed by the security door. The reader 20 will read both the RFID reference chip and the chip carried within the ballot form. If not, or in the case of a reading of several ballots in the envelope, the motor of the flap 27 will not be activated, and the voter will be asked to withdraw his ballot form by an audio and/or visual message.

It is also possible, as can be seen in FIG. 7, to place at least two inductive coils 29 on both sides of the security door 26 to measure the magnetic value of a standard ballot. Preferably, four coils 29 are used, placed by pairs on both sides of the passageway formed by the security door 26. These coils are connected to the self-contained unit 21. When an envelope with a standard ballot is inserted into the security door 26, the coils generate an electrical signal characteristic of the inserted ballot. The value of the measured magnetic field is compared to a reference value representative of a ballot and of a standardized envelope previously recorded in a dedicated memory of the self-contained unit 21. Thus, it is now possible to detect both the presence of several ballots in the envelope and the presence of an irregular ballot. In these illustrative cases, the actuating electric motor of the flap 27 will not be activated, and the voter will be asked to withdraw his ballot form.

It goes without saying that the depth of the security door 26 will be less than the length of the envelope so that the latter can be easily withdrawn in the case of an invalid vote.

Alternatively, a system of ejector rollers activated by a motor controlled by the self-contained unit 21 and putting pressure against and on both sides of the envelope can be provided in the security door. In the case of an invalid vote, these rollers will be activated in the direction of ejection of the envelope outside the ballot box whereas in the case of a valid vote, these rollers, after opening the flap 27, will be activated in the direction of insertion of the envelope in the ballot box.

The safety door 26 as well as the readers 20 and/or the RFID reference chip 28 and/or the inductive coils 29 can be placed in a metal sheath, not shown, forming a Faraday cage so that these elements cannot be exposed to electromagnetic disturbances.

The ballot box, according to the invention, can be equipped with a second security door with mechanically activated flaps so that even during an electrical outage, the vote can take place by means of this second security door. This second security door, when the first is active, will, of course, be locked by any appropriate means.

The facility can be equipped with a contactless portable reader 24 that is capable of being connected to the self-contained unit 21. This reader can be used to read after counting the content of the memories of each ballot and thus to verify consistency between the name of the candidate written in the clear on the ballot and the content of the memory 12 that the ballot's chip comprises. In the event of a discrepancy, the ballot can be considered as either invalid or else valid, the writing in the clear of the candidate's name on the ballot then taking precedence over that written in the memory.

The facility can also be equipped with a monitoring screen 25 provided to be connected to the self-contained unit 21. This screen will allow the display of the voting results during a manual recount.

FIG. 3 shows a facility according to a second embodiment. It is observed in this figure that, in each voting booth of this facility, the following are arranged:

- A scanning interface 50 of the touch screen type, for example, by which the voter selects his candidate, this scanning interface 50 being connected to a central unit 51 that is at a distance and separate from the self-contained unit 21,
- A unit 52 for producing a ballot form 1 from a blank ballot, connected to the central unit 51, capable of writing, on one of the sides of the ballot to be produced, the name and/or the photograph of the candidate selected by the voter, and
- A contactless read-write unit 53 connected to the central unit 51 that is capable of writing the voter's selection in the memory 12 of the ballot, this unit 53 being preferentially integrated into the ballot form production unit 52.

The scanning interface 50, in the form of a touch screen of any known type, will be capable of simultaneously displaying the photographs and the names of the different candidates, their political affiliations, as well as their numbers. On this touch screen, there will be displayed instructions relative to the procedure for making a selection and for producing the ballot form; these instructions can also be disseminated by electroacoustic transducers associated with the scanning interface. The candidate selection will be made by pressing on a dedicated area of the screen, for example in the area displaying the candidate's photograph or his political affiliation. This selection will have to be validated by pressing on a dedicated area of the screen. The selection and the validation will be sent to the central unit 51 in order to produce a ballot form. The central unit 51 will then transmit production commands and production data to the production unit 52 so that the latter prints on one of the sides of a blank ballot the name and/or the photograph of the selected candidate as well as his political affiliation. These data relative to the voter's selection will also be transmitted by the central unit 51 to the read-write unit 53 so that the latter writes them into the memory 12 of the ballot 1. By means of this read-write unit, the central unit will be capable of reading the identification code that is prerecorded in the memory 11 of the ballot and of verifying its validity. This code for the current voting session will be written into a dedicated memory of the central unit 51. The central unit 51 can then verify the uniqueness of the identifier by comparison with those already written into the memory.

Advantageously, the scanning interface 50 is equipped with a contactless reader module 54 that is capable of reading the writing contained in the memories of the ballot after production of the latter, so that at least the writing relative to the voter's selection can be displayed on said scanning unit and verified by the voter.

The production unit 52 and the contactless read-write unit 53 are shown schematically in FIG. 4. In this figure, it can be observed that these two units 52 and 53 are arranged in two separate compartments 60, 61 set up in an appropriate container 6 made from a material that is capable of forming an electromagnetic insulator.

The production unit 52 housed in the upper compartment 60 is advantageously made up of a thermal printer of any known type; the paper used for producing the ballot will be thermal. This printer 52 is equipped with an appropriate support equipped with a hub on which a roll of blank ballots arranged in a band is threaded. This band enters the printer by passing through an insertion opening and emerges from it by passing through an output opening. Between these two openings, the band is engaged in a motorized drive mechanism and moves first opposite a thermal print head and then opposite a controlled-action cutting element that is capable of splitting it widthwise to cut out a ballot form 1. Before separation, the ballot form 1 is for the most part situated outside of the printer, as can be seen in FIG. 4, and advantageously is engaged, by passing through an appropriate opening, in the compartment 61 containing the read-write unit 53. As can be observed, this compartment is to the side of the compartment 60 and is separated from the latter by a vertical partition 64 in which said passage opening for the ballot is formed. This opening is located opposite the output opening that the printer comprises. The lower part of this compartment is constructed as a ballot receptacle and can include a presence sensor 610. This presence sensor will be capable of emitting an error signal if, following a cutting command, no ballot is present in the lower part of the compartment 61.

Before cutting, the data will be written into the memory 12 of the ballot and read to verify the consistency thereof. If the writing in the memory is erroneous or illegible, the ballot is destroyed, and for this purpose, the printer motor will first be activated in the paper return direction in the printer, over a distance corresponding to the length of the ballot, and then will be driven in the output direction over a distance of a few millimeters, and the cutting element will be activated so as to cut the ballot. This cycle will be repeated until the ballot is completely shredded. The strips formed by cutting up the ballot will fall into a dedicated receiving tray 62 installed in a lower compartment 63, separated from the upper compartment by a horizontal partition 65 equipped with a through opening for passage of the strips. As can be observed, the printer is located at a distance from the vertical partition separating the compartment 60 from the compartment 61, and a through opening for passage of strips is made in the separating wall between the compartments 60 and 63 in the vicinity of the vertical partition 64.

Carefully, the production unit 52 will be equipped with a heating element, not shown, made up of an electrical resistor supplied with electrical energy by a source that is separate from that of the production unit 52. Thus, in the case of a breakdown in the ballot cutting operation, or else in the event of a paper jam, this resistor, located opposite the path of the ballot, will be activated so that the ballot is blackened and rendered illegible.

It should be specified that the reader sensor of the reader module contained in unit 53 is installed at a distance from the walls of compartment 61 so that it cannot read ballots other than the one that is being issued by the printer.

It is advantageous to be able to authorize the destruction of a ballot after production so that an erroneous ballot or one that is not consistent with the voter's selection cannot be introduced into the ballot box. For this purpose, the facility can be equipped with a destruction device provided with a ballot intake mechanism and made up of two drive rollers that are capable of driving, first of all, the ballot or the envelope that contains it across a read-write device that is capable of reading and erasing the ballot memory or memories, and into a shredding device made up of cutting blades, capable of slashing the ballot into strips. The read-write device will be connected to the central unit. This ballot, reported as erroneous to the central unit 51 because of its passage in front of the read-write device of the destruction device and its recognition as a ballot, will have to be destroyed in order to authorize the production of a new ballot.

The central unit 51, of any known type, for example of the microcomputer type, will be connected advantageously to a—or to at least one—contactless reader 20 as well as to the counter 23 that the ballot box 2 comprises in order to receive from them the reading and counting results. These data will be written into the dedicated memories. This unit will also be connected to the RFID reference chip 28 and/or to the inductive coils 29 as well as to the writing device in the additional memory zone of the ballot chip 10 and of the representative code for insertion of this ballot into the ballot box, if these elements are present.

Lastly, the central unit 51 will be connected to a centralizing body for transmission to the latter of the voting results after the close of voting.

It goes without saying that this invention can accommodate any adjustments and variants of the field of equivalent techniques without thereby exceeding the scope of this patent as defined by the claims below.

The invention claimed is:

1. An electronic ballot facility, using ballot forms (1), at least one voting booth (4) for the use of voters to place ballot forms in envelopes, and at least one ballot box (2) that is suitable for receiving said envelopes along with the ballot forms;

wherein each ballot form (1) is provided with at least one electronic chip (10), the electronic chip (10) including a first contactless reader memory (11) in which a ballot identification code is recorded, and a second permanent contactless read-write memory (12) provided to receive a selection of one of the voters;

wherein on a side of the ballot (1), the ballot (1) has at least one of a name, a photograph, and a number of the candidate, at least one of the name and the number of the candidate being written into at least one of the first contactless reader memory (11) and the second permanent contactless read-write memory (12);

wherein each of the at least one ballot box (2) is equipped with at least one reader (20) with at least one sensor that is capable of reading, without contact, when one of the ballot forms is inserted therein and through the envelopes, content of the first contactless reader memory (11) and the second permanent contactless read-write memory (12) of the electronic chip, the at least one reader (20) being connected to a self-contained microprocessor unit (21) that is built into the at least one ballot box (2), the self-contained microprocessor unit (21) being equipped with a local memory (22) in which the contents of the first contactless reader memory (11) and the second permanent contactless read-write memory (12) of the ballot forms (1) are recorded;

wherein the ballot box (2) is equipped with a security door (26) establishing a passageway for one of the envelopes, the security door (26) being equipped with a lower flap (27) with controlled opening, the at least one reader (20) being placed against the security door facing the passageway established by the security door (26).

2. The electronic ballot facility according to claim 1, wherein the electronic chip (10) is a radio-frequency identification (RFID) electronic chip.

3. The electronic ballot facility according to claim 1, wherein the ballot box (2) is equipped with an electronic counter (23), connected to self-contained microprocessor unit (21), in order to count a number of ballots inserted into said ballot box, the number being recorded in the local memory (22).

4. The electronic ballot facility according to claim 1, wherein the at least one reader (20) includes a first reader (20) and a second reader (20) placed opposite the first reader (20), the first and second readers (20) being placed on both sides of the passageway formed by the security door (26).

5. The electronic ballot facility according to claim 1, wherein a radio-frequency identification (RFID) reference chip (28) is placed opposite the at least one reader (20), the RFID reference chip (28) and the at least one reader (20) being located on both sides of the passageway formed by the security door (26).

6. The electronic ballot facility according to claim 1, comprising at least two inductive coils (29) to measure a magnetic value of a standardized ballot, said at least two inductive coils (29) being located on both sides of a channel (26) formed by the security door.

7. The electronic ballot facility according to claim 1, comprising ejector rollers acting in a channel (26) of the security door, the ejector rollers being motor-activated, and capable of pressing against and on both sides an envelope of the envelopes.

8. The electronic ballot facility according to claim 1, wherein the security door (26) and at least one of the at least one reader (20), a radio-frequency identification (RFID) reference chip (28), and inductive coils (29) are placed in a metallic sheath forming a Faraday cage.

9. The electronic ballot facility according to claim 1, comprising a contactless, portable reader (24), connected to the self-contained unit (24) to read the contents of the first contactless reader memory (11) and the second permanent contactless read-write memory (12) of each ballot form (1) after review.

10. The electronic ballot facility according to claim 1, wherein the electronic chip (10) of each ballot form (1) comprises an additional memory zone that is capable of receiving a code that is representative of insertion of a ballot form (1) of the ballot forms (1) into the ballot box, the additional memory zone, after writing of the code, being rendered inaccessible for writing and wherein the ballot box is equipped with a writing device that is capable of writing the code into the additional memory zone.

11. An electronic ballot facility, using ballot forms (1), at least one voting booth (4) for the use of voters to place ballot forms in envelopes, and at least one ballot box (2) that is suitable for receiving said envelopes along with the ballot forms;

wherein each ballot form (1) is provided with at least one electronic chip (10), the electronic chip (10) including a first contactless reader memory (11) in which a ballot identification code is recorded, and a second permanent contactless read-write memory (12) provided to receive a selection of one of the voters;

wherein on a side of the ballot (1), the ballot (1) has at least one of a name, a photograph, and a number of the candidate, at least one of the name and the number of the candidate being written into at least one of the first contactless reader memory (11) and the second permanent contactless read-write memory (12);

wherein each of the at least one ballot box (2) is equipped with at least one reader (20) with at least one sensor that is capable of reading, without contact, when one of the ballot forms is inserted therein and through the envelopes, content of the first contactless reader memory (11) and the second permanent contactless read-write memory (12) of the electronic chip, the at least one reader (20) being connected to a self-contained microprocessor unit (21) that is built into the at least one ballot box (2), the self-contained microprocessor unit (21) being equipped with a local memory (22) in which the contents of the first contactless reader memory (11) and the second permanent contactless read-write memory (12) of the ballot forms (1) are recorded;

wherein each voting booth (4) that the electronic ballot facility comprises is equipped with:

a scanning interface (50) by which a voter of the voters selects the candidate, the scanning interface being connected to a central unit (51), distant and separate from the self-contained microprocessor unit (21) linked with the ballot box (2), a production unit (52) of the ballot form, from a blank ballot, connected to the central unit (51), capable of writing at least one of the name and the photograph of the candidate selected by the voter on one of the sides of the ballot form to be produced, and a contactless read-write unit (53) connected to the central unit (51) that is capable of writing the selection of the voter into the permanent contactless read-write memory (12) of the electronic chip (10) of the ballot form, the contactless read-write unit (53) being integrated into the production unit (52) of the ballot form.

12. The electronic ballot facility according to claim 11, wherein the central unit (51), after the candidate selection is written into the permanent contactless read-write memory (12) of the electronic chip of the ballot (1), permanently locks the permanent contactless read-write memory (12) to prevent any subsequent writing access.

13. The electronic ballot facility according to claim 11, wherein the central unit (51) is connected electrically to the at least one reader (20) of the ballot box (2) and to an electronic counter (23) of the ballot box (2).

14. The electronic ballot facility according to claim 11, wherein the scanning interface (50) is made up of a touch screen on which the names of the candidates as well as an option of a blank vote are displayed.

15. The electronic ballot facility according to claim 14, wherein the production unit (52) comprises a controlled-action cutting element that is capable of cutting a ballot form.

16. The electronic ballot facility according to claim 15, wherein the production unit (52) is equipped with a heating element made up of an electrical resistor supplied with electrical power by a source that is separate from that of the production unit, said electrical resistor being activated so that the ballot forms are blackened and rendered illegible during a failure of the cutting operation or during a paper jam.

17. The electronic ballot facility according to claim 15, wherein the writing into the permanent contactless read-write memory (12) of the ballot forms (1) takes place after the ballot forms are printed by a thermal printer (52).

18. The electronic ballot facility according to claim 17, wherein the contactless read-write unit (53) is located beyond a paper output of the printer, external to a space containing print head, and is separated from said space by a physical barrier made up of one or several partitions.

19. The electronic ballot facility according to claim 11, wherein the production unit (52) of the ballot forms is a thermal printer.

20. The electronic ballot facility according to claim 11, comprising a container (6) in which an upper compartment (60) is formed that is provided to receive the production unit (52), a side compartment (61) provided to receive the contactless read-write unit (53), said side compartment (61) being separated from a preceding one by a vertical partition (64) equipped with a passage opening for the ballot, said container being equipped, moreover, with a third compartment (63) provided to receive a tray (62), the third compartment being separated from the upper compartment (60) by a horizontal separating partition (65) equipped near the vertical separating partition with a through opening for the passage of strips formed during the destruction by shredding of an erroneous ballot.

21. The electronic ballot facility according to claim 20, comprising a presence sensor (610), said presence sensor being capable of emitting a defect signal if, following a cut command, no ballot is present in the lower part of the compartment (61).

22. The electronic ballot facility according to claim 11, wherein the scanning interface unit (50) is equipped with a contactless reader module (54) that is capable of reading writing contained in the first contactless reader memory (11) and the second permanent contactless read-write memory (12) after production of the ballot forms, so that at least writing relative to a candidate selection can be displayed on said scanning unit and verified by the voter.

23. The electronic ballot facility according to claim 11, comprising a destruction device provided with a ballot intake mechanism that is made up of two drive rollers that are capable of driving, the ballot forms or the envelopes that contains the ballot forms across a read-write device that is capable of reading and erasing the first contactless reader memory (11) and the second permanent contactless read-write memory (12) and into a shredding device made of cutting blades, capable of shearing said ballot into strips.

* * * * *